(12) United States Patent
Tracton et al.

(10) Patent No.: US 6,470,378 B1
(45) Date of Patent: Oct. 22, 2002

(54) DYNAMIC CONTENT CUSTOMIZATION IN A CLIENTSERVER ENVIRONMENT

(75) Inventors: Kenneth Tracton, Sunnyvale; Kosar Jaff, San Jose; Walter Shands, Soquel, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/283,114

(22) Filed: Mar. 31, 1999

(51) Int. Cl.[7] .................................................. G06F 15/16
(52) U.S. Cl. ........................................ 709/203; 709/235
(58) Field of Search .................................. 709/227, 228, 709/230, 231, 233, 235, 203

(56) References Cited

U.S. PATENT DOCUMENTS

| | | | | |
|---|---|---|---|---|
| 5,588,148 A | * | 12/1996 | Landis et al. .................. | 707/1 |
| 5,953,506 A | * | 9/1999 | Kalra et al. .................. | 709/231 |
| 6,043,837 A | * | 3/2000 | Driscoll, Jr. et al. .......... | 348/36 |
| 6,167,441 A | * | 12/2000 | Himmel ...................... | 709/217 |
| 6,260,021 B1 | * | 7/2001 | Wong et al. .................. | 705/2 |

* cited by examiner

*Primary Examiner*—Mehmet B. Geckil
(74) *Attorney, Agent, or Firm*—Steven D. Yates

(57) ABSTRACT

The invention provides for servicing a client. A request is received from a client having certain capabilities. This request is automatically satisfied in a manner tailored to the capabilities of the client.

19 Claims, 7 Drawing Sheets

```
<html><head><title></title></head>                    200   202
<body><script language="JavaScript">   204
<!-
var HIGHSPEED = '<META HTTP-EQUIV="Refresh" CONTENT="0;   206
                  URL=HighContentHomePage.htm">'
var MEDSPEED = '<META HTTP-EQUIV="Refresh" CONTENT="0;   208
                  URL=MedContentHomePage.htm">'
var LOWSPEED = '<META HTTP-EQUIV="Refresh" CONTENT="0;   210
                  URL=LowContentHomePage.htm">'
var ver = navigator.appVersion;   212
if (navigator.appName=="Netscape" && navigator.appVersion.charAt(0)>="5")
         {     var clkspd = hardware.clockSpeed;                        214
   216     if (clkspd >= 300)             218
            {      var arch = hardware.architecture;
       220          var family = arch.charAt(33);   222
           224    if( family >= 6 )
              226       document.write( HIGHSPEED );
                    else if( family = 5 )
                        document.write( MEDSPEED );
                 228    else
           230              document.write (LOWSPEED );
             }
  232          else document.write( LOWSPEED );
      }
else document.write( LOWSPEED);
<!-- end script -->
</script></body></html>
```

FIG. 6

DYNAMIC CONTENT CUSTOMIZATION IN A CLIENTSERVER ENVIRONMENT

FIELD OF THE INVENTION

The invention relates to the field of networking. In particular, the invention relates to scaling network content according to data-recipient characteristics such as processing ability and client-to-server network throughput.

GLOSSARY

The following glossary of terms is intended to clarify the meaning of acronyms, terms or phrases used in the description and claims that follow. This section is not meant to be exhaustive. Unless otherwise indicated, these explanations augment, not supplant, term usage. Please note that some of these terms, even though not designated, may be trade marks, and these marks are the property of their respective owners.

Processor or microprocessor means the Central Processing Unit (CPU) of a computing device. Examples include the following processors and equivalents: the DEC Alpha, a RISC (Reduced Instruction Set Computer) processor from Digital Equipment Corporation of Maynard, Mass.; PowerPC, a RISC processor jointly designed by Motorola of Schaumberg, Ill., IBM of Armonk, N.Y., and Apple Computer of Cupertino, Calif.; AMD processors from Advanced Micro Devices of Sunnyvale, Calif.; Cyrix processors by Cyrix of Richardson, Tex.; MIPS processors from MIPS Technologies, Inc.; and, Intel architecture processors from Intel Co. of Santa Clara, Calif., which include the 80286, 80386, 80486, Pentium® processors, and their variants, equivalents, and successors.

ISDN means Integrated Services Digital Network and equivalents. Frame Relay means technology for implementing Wide Area Networking (WAN). LAN means Local Area Network. JTC means Joint Technical Committee, a standardization body including the ISO (International Organization for Standardization) and IEC (International Electrotechnical Commission), organizations responsible for creating and maintaining international standards. TCP/IP means Transmission Control Protocol over Internet Protocol, and includes related protocols such as ICMP, the Internet Control Message Protocol extension to TCP/IP. IPX means Internetwork Packet eXchange, and includes related protocols such as SPX (Sequenced Packet Exchange), a transport layer protocol built on top of IPX. AppleTalk generally refers to networking protocols used by Apple Computer systems.

SGML means Standard Generalized Markup Language and equivalents, an ISO defined language for representing relationships between a document's content and structure. HTML means Hypertext Markup Language and equivalents, a document format based on SMGL that uses "tags" to flag formatting and structure. FTP means File Transfer Protocol, a client-server protocol (and application program) for file transfer over a network. Gopher and WAIS represent examples of searchable distributed document retrieval systems for locating data including text, images, sounds, etc.

PCI means Peripheral Component Interconnect, a particular example of high-performance buses for coupling peripherals to a computing device and its processor. AGP means Accelerated Graphics Port. VESA means the VESA Local Bus defined by the Video Electronics Standards Association. ISA means Industry Standard Architecture, EISA means Extended Industry-Standard Architecture, and MCA means Micro Channel Architecture.

Client means a computing device or computer program (executing on a computing device) that requests services from a server. Server means a computing device, or computer program executing on a computing device, that provides some service to client programs or client systems. The client and server communicate over a communication link (e.g., a network). Communication is according to a protocol, which may be a message based protocol. The server may operate continuously, or be initialized and unloaded as needed (e.g., through manual invocation or by a program-loader in response to client connection attempts). There may be several clients and servers, each taking on the role of client or server, depending on context.

In typical client-server environments, a server maintains information in local storage for eventual retrieval by clients. In small networks, such as an office intranet, one can control the characteristics of the computers being networked together, and ensure clients have adequate processing resources and network throughput to process data sent by the server. With the advent of low-cost public-access networks, such as the Internet, it has become increasingly common to network together many different computer architectures. Now, unknown clients of unknown capabilities can connect to the server, and it is no longer feasible to regulate the characteristics of the incoming client. (Although this description focuses on Internet-based client-server communication, the principles herein apply to other networking contexts as well.)

For example, the server may have a web page containing a link to complex video data that requires significant client resources to process. But, the server cannot control contact from an underpowered client having insufficient resources to process server data. When such a client tries to receive and process the data, it will be unable to effectively do so (e.g., playback will not be smooth); such processing failures are generally blamed on the server, and alienate current and potential customers.

To avoid such problems, as a stop-gap measure, servers have been configured to provide a contacting client the option of electing to receive data from different sources, where each selection is based on the client's theoretical network link speed. For example, a client might be presented with a web page indicating "Click here if you have a T1 line to the Internet," or "Click here for 128K ISDN," or "Click here if you have a 56K connection," etc. (Note that the terms "client" and "server" actually refer to computing devices, and references to client or server actions, such as "selecting" web page items, it intended to refer to a user, control program, or alternate input source that in fact manipulates the computing device to effect the indicated result.)

One problem with this stop-gap solution is that it does not address whether the client has support for processing the received data, e.g., the network link is fast enough, but the client lacks sufficient memory or processing power to digest the received data. A second problem is the assumption that the client actually knows its network link speed. In corporate environments, clients frequently access networks through distant firewalls, and it can be unclear whether they are connecting through Frame Relay, ISDN dial-out, intranet, or to a "smart" system that dynamically selects a "fastest" of several network routes. A third, subtler problem, is that assuming the client knows its theoretical network link speed, this information is unhelpful if the client's realizable data throughput to the server is different. That is, if the client has a T1 link to the Internet, but the effective throughput is only 56 K-bits (b 56K), then selecting the T1 source option will result in poor performance.

What is needed, then, is a way for the server to accurately determine the client's system configuration (e.g., processor speed, memory configuration, etc.), effective network speed, at the time of contact from the client. This would allow the server to tailor its output to meet the capabilities of each incoming client.

SUMMARY

The invention provides for servicing a client. A request is received from a client having certain capabilities. This request is automatically satisfied in a manner tailored to the capabilities of the client.

BRIEF DESCRIPTION OF THE FIGURES

FIG. 6 illustrates example web page content for client-side redirection to scaled content according to client characteristics, in accordance with one embodiment.

DETAILED DESCRIPTION

Figure 1:
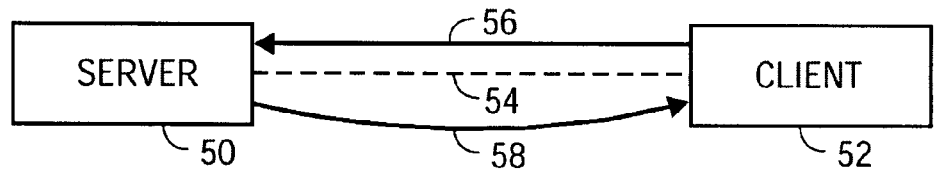
FIG. 1 shows a typical server-client network communication configuration.

FIG. 1 shows a typical client-server configuration, in which a server 50 and client 52 are in communication over a network 54. As shown, the server receives a request 56 for data from the client. In response, the server automatically responds with a capability-tailored reply 58. There can be great benefit in tailoring data sent to the client when it is known, for example, that the client does or does not have certain codecs (compressors/de-compressors), processing power, network bandwidth, etc.

Traditionally, the way to effect tailored distribution of data was to require the client to manually elect one of several possible replies, according to the client's determination of its own capabilities. As illustrated, instead of requiring client 52 determination of appropriate data, the server 50 instead automatically sends customized results 58.

Figure 2:
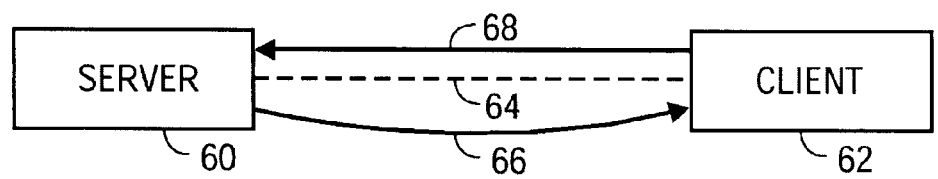
FIG. 2 shows a second server-client network communication configuration.

FIG. 2 shows a client-server configuration, in which a server 60 and client 62 are in communication over a network 64. As shown, the server sends a query 66 to the client, requesting the client to identify its capabilities. In response to the query 66, the client sends to the server a characteristic profile 68 indicating to the server the client's available computing resources (e.g., codecs, processing power, etc.) and network bandwidth. Such an interrogation/response system allows the server to prepare or direct the client to appropriate resources (e.g., FIG. 1 capability-tailored response 58).

Figure 3:
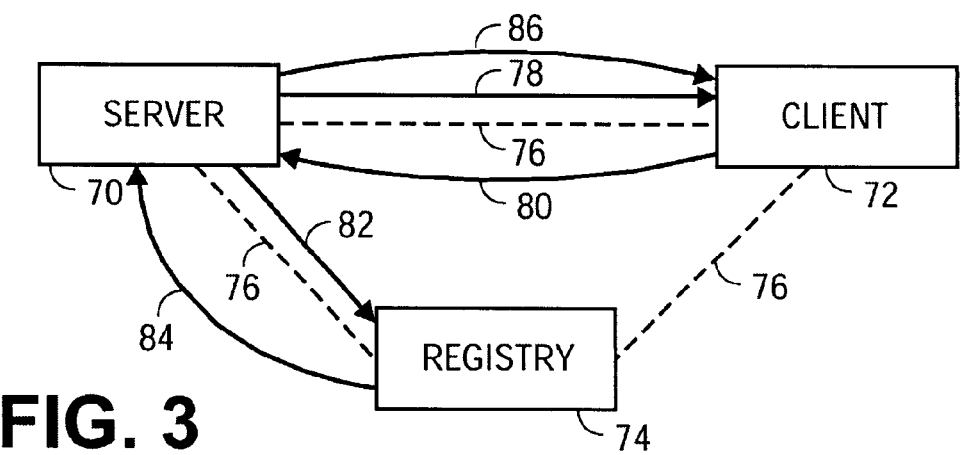
FIG. 3 shows a third server-client network communication configuration.

FIG. 3 shows a client-server-registry configuration, in which a server 70, client 72, and central registry 74 are in communication over a network 76. As shown, the server sends a query 78 to the client, requesting the client to identify its capabilities. In response to the query 78, the client sends to the server a client identifier 80. This identifier 80 identifies the client, and may be encrypted so that the server can not ascertain the client's identity, and only the central registry 74 can decode the client identifier 80. The server then forwards 82 the identifier to the registry, and in response thereto, the registry 74 sends the server a characteristic profile 84 to the server 70. In response to receiving the profile, the server 70 can now provide the client 72 with capability-tailored data 86 while simultaneously allowing the client to anonymously transact with the server.

Figure 4:
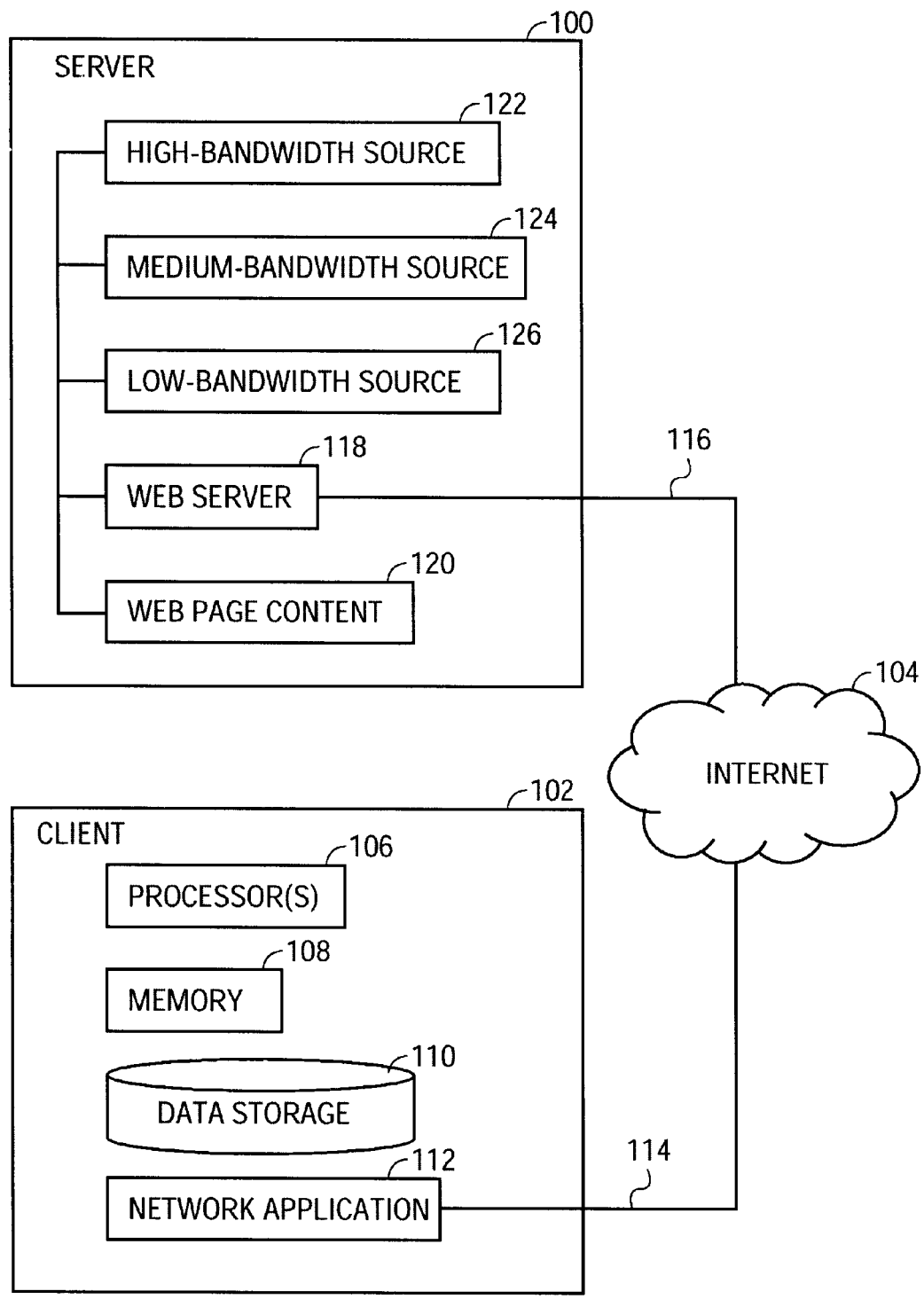
FIG. 4 shows a fourth server-client network communication configuration.

FIG. 4 illustrates a typical configuration of a server 100 in communication with a client 102 via the Internet 104. As shown, the client has one or more processors 106, memory storage 108 of some capacity (see FIG. 9 item 408), data storage 110 of some capacity (see FIG. 9 items 410, 412, 414), and a network application 112, such as an web browser. As shown, the client is communicating with the server over a network connection 114 to the Internet 104. (Note that the illustrated components of the client and server configurations are illustrative.)

The server 100 is communicating with the client 102 over a network connection 116 to the Internet 104. The server is executing a web server 118 network application program that is providing web page content 120 to the client. In this FIG. 4 embodiment, the server has three different source content streams 122, 124, 126, corresponding to source content that has been scaled to correspond to typical incoming client characteristics.

For example, assume an original source content is stored as a Moving Pictures Expert Group (MPEG)-2 encoding of a news report. The MPEG standard (ISO/IEC JTC 1/SC29/WG11), has several coding formats. These include the MPEG-1 (JTC1.29.05.01), MPEG-2 (JTC1.29.05.02), MPEG-4 (JTC1.29.13), and others. Each coding method is defined with respect to an expected realizable client network throughput. MPEG-2 expects the client to have a network link speed of up to 40 M-bits/sec, and is used herein to represent an unscaled 122 version of the report. MPEG-1 expects a network link speed of 1.5 M-bits/sec, and is used herein to represent scaled data 124 suitable for retrieval over a medium-speed network link. MPEG-4 expects a low bit-rate of about 64 K-bits/sec (e.g., a single-channel digital ISDN link, or 56K-modem), and is used herein to represent scaled data 126 suitable for retrieval over low-speed network link.

When a client contacts the server, and selects an item on a web page corresponding to the presentation, it is preferable that the server ensure that the client can realistically retrieve and display the selected information. Determining which source content to make available to the client is a somewhat complex task. Traditionally, servers notify the client of available sources 122, 124, 126, and the client is made responsible for selecting an appropriate source. Typically, the client is prompted to choose according to the speed of the client's network connection 114 to the Internet. In the context of web browsers (client network application 112) and web servers 118, choices are presented by web links to the different sources 122, 124, 126.

One problem with this technique is assuming that link-speed accurately reflects the client's ability to process content information 120 sent by the server. As discussed above, the different MPEG coding standards place different processing burdens on the client, each predicated on the client being able to process data received at a certain rate. Consequently, it is not helpful if the client has a T1 network link 114, but cannot process the data because it suffers from an under-powered processor, limited memory, limited disk storage, or other limited resource. These limited resources may be due to physical limitation, or simply client load (e.g., the number of other tasks operating). Limited resources can require that the client be sent data at a slower rate, or a simpler encoding format utilized, to allow the client to keep up with received data. (Conversely, it is not helpful if the client has the processing ability, but the network link 114 speed is too slow, forcing the client to stall from buffer under-runs.)

Figure 5:
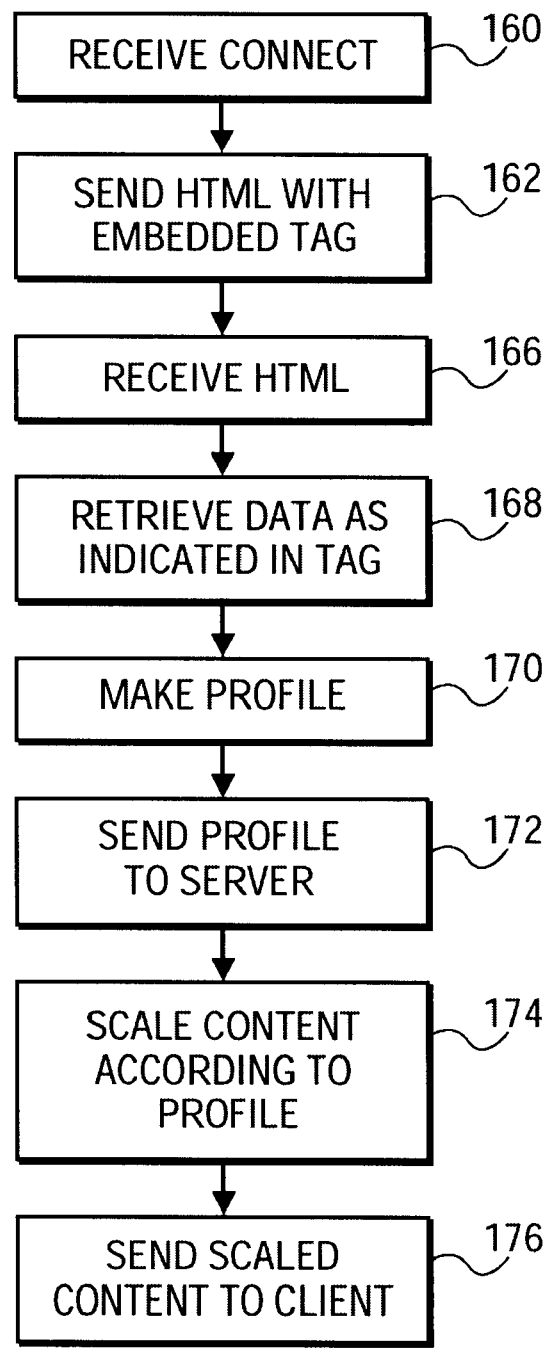
FIG. 5 is a flowchart of a server determining client characteristics, in accordance with one embodiment.

FIG. 5 shows a method, in accordance with one embodiment of the present invention, for avoiding requiring a client 102 to choose an appropriate data-stream. It is assumed the client 102 network application 112 is an web browser, and the server 100 utilizes a web server 118 to deliver scaled content to the client. A browser receives web page data from a server. A web page is generally composed of textual data, where some text is presented in a special format that is interpreted by the contacting application 112 as directives for taking some desired action. Most such directives concern formatting preferences, structural definitions (e.g., a table), and links to resources in server storage (see FIG. 9 items 410, 412, 414) or elsewhere on the network. Directives can also be programming language statements that are to be interpreted or executed by the contacting application 112. For web browser applications in particular, common languages include Java, JavaScript, J++, Visual Basic, ActiveX.

When a client contacts a server, the server's web server receives a connection request 160. In response to the connection request, the server (typically) sends 162 the client HTML formatted data. Embedded within this data are programming instructions to cause the client to create a characteristic profile containing the client's processing ability and network configuration, and to send the profile to the server. So, when the browser receives 166 the instructions, it processes 168 the embedded instructions, which in turn call routines built into the browser. Note that security models imposed on processing Internet data generally prevent web browsers from directly executing code received from a server. Thus, it is required that the data (e.g., JavaScript code) call known to be safe built-in routines. In alternate non-browser contexts, or when security is disabled, this two-tiered approach may not be necessary, and the code may be directly executed.

Thus, after executing the code, and the desired client data retrieved 168, a client characteristic profile is generated 170. This profile is then sent 172 to the server. In one embodiment, the client data includes detailed information about the client architecture and network configuration. For example, the profile can include processor data such as number of processors, speeds, types, cache and memory management, stepping, special-purpose instructions (e.g., 2D/3D rendering support, or high-end mathematics), as well as network theoretical-speed, actual-throughput, type (e.g., TCP/IP, IPX, AppleTalk), routing data, firewall latency, etc. On receipt of this data, the server can appropriately scale 174 the original source content according to client capabilities, network speed, and other abilities/restrictions indicated in the profile. The scaled content is then sent 176 to the client. However, there are circumstances where a server might not want to dynamically scale data, and instead wants to direct the client to certain web locations depending on the client's characteristic profile.

FIG. 6 shows an example web page that, when received and processed by the client browser, causes the client browser to be redirected towards an appropriate data source. In this example, the client does not send a characteristic profile back to the server. Instead, the server has pre-prepared several version of an original source material, and embedded selection logic into the web page, where this logic directs the client's browser to an appropriate source based on testing the client capabilities.

Shown is a sample HTTP encoded web page containing embedded program code. A web page is typically composed of different sections, where tags mark the beginning and ending (if required) of a section. For example, items 200 and 202 represent the start and end of an empty "title" section. The sample code uses JavaScript for illustrative purposes, and it should be understood that other scripting and non-scripting (e.g., binary-type) languages can be used instead.

Item 204 tells the client application program 112 to expect JavaScript code, as opposed to an alternate language. Item 206 represents the introduction of a comment, which actually contains the JavaScript code to execute. Technically, comments were originally introduced to allow a web designer to insert descriptive material about the web page without having to worry about that information being displayed. As HTML standards evolved over time, comments were used to include new language features, while still maintaining compatibility with earlier network applications. Unknown tags are ignored. If the application does not recognize the JavaScript designation 204, then it will not know to process the commented material 206.

Items 206, 208, 210 are variable definitions corresponding to an HTML "Refresh" command containing Uniform Resource Locator (URL) designations for the high-bandwidth, medium-bandwidth, and low-bandwidth sources of FIG. 4 (items 122, 124, 126). The refresh command, when presented to a browser, will cause the browser to load the specified web page URL, at a time delay of 0 (i.e., immediately on receiving the command).

Item 212 illustrates calling an embedded method. JavaScript is an object oriented type of language, and a "method" is equivalent to calling a function or procedure in a non-object oriented language. Here a variable "ver" is defined to contain the result of calling navigator.appVersion 212, which returns the creator of the client's network application program 112 (FIG. 4).

The returned value is inspected 214 to ensure that the application is a Netscape browser having a version number equal to or exceeding 5. For this example, it is assumed that only Netscape browser versions 5 and greater support the ability to retrieve (FIG. 5 items 168) and send (FIG. 5 item 170) a client characteristic profile to the server 100.

Next, the script inspects the clock speed of the client device 102. The server is attempting to determine whether the client has the raw horsepower to process high-bandwidth content. Processors have many characteristics, but here the server is only concerned with CPU speed and type. If the CPU speed exceeds 300 MHz 216, then another method is called to identify the CPU type 218. (Note that the hardware.architecture call will return many details about the client architecture, including CPU manufacturer, type, family, stepping, features, etc.; these details are stored in the "arch" 220 variable.) Item 222 contains an index operation to identify the portion of "arch" indicating CPU family (e.g., Pentium®, Pentium® III, Pentium® III, etc.) Here the test is directly dependent on knowing that when "arch" contains "ARCHITECTURE=Intel", location 33 of "arch" contains the CPU family. Different parsing techniques can be applied according to the named architecture (e.g., Intel, MIPS, Alpha, PowerPC, unknown, etc.).

Here, if 224 the family equals or exceeds 6, then it is known that the client computing device has at least a Pentium Pro® or Pentium II® architecture. Consequently the client meets the server's requirements for receiving the high-bandwidth 122 content referenced in the HIGHSPEED variable 206. (Note that if the server was concerned about available memory, the script could have included testing the result of hardware.ram, or perhaps hardware.storage.) Similarly, if 226 the family equals 5, then it is known that the client computing device has a Pentium processor™. Here, the server has concluded that such a processor is underpowered and only meets the server's requirements for receiving the medium-bandwidth 124 content referenced in the MEDSPEED variable 208.

If 228 the processor is neither a Pentium Pro®, Pentium II®, or Pentium®, or if 230 the clock speed was less than 300 MHz, or if 232 the client's network application 112 is not a supported web browser, then the client will be directed towards the low-bandwidth 126 content referenced in the LOWSPEED variable 210. The LOWSPEED page is intended to allow the server to prepare low-complexity content that is acceptable to a common-denominator of incoming clients (e.g., assuming everyone has an Intel 80486 or equivalent processor and a network link speed of at least 28.8K).

In addition, one can easily support other architectures, such as text-only pagers or cellular-phone based browsers, by adding these architectures to the JavaScript code. Or, one could provide targeted redirection, such as advertising, or custom page data, based on the details provided by JavaScript method calls. For example, web browsers can be designed to support a method called hardware.identifier, which would return a (permanently or temporarily) unique identifier for the client.

Figure 7:
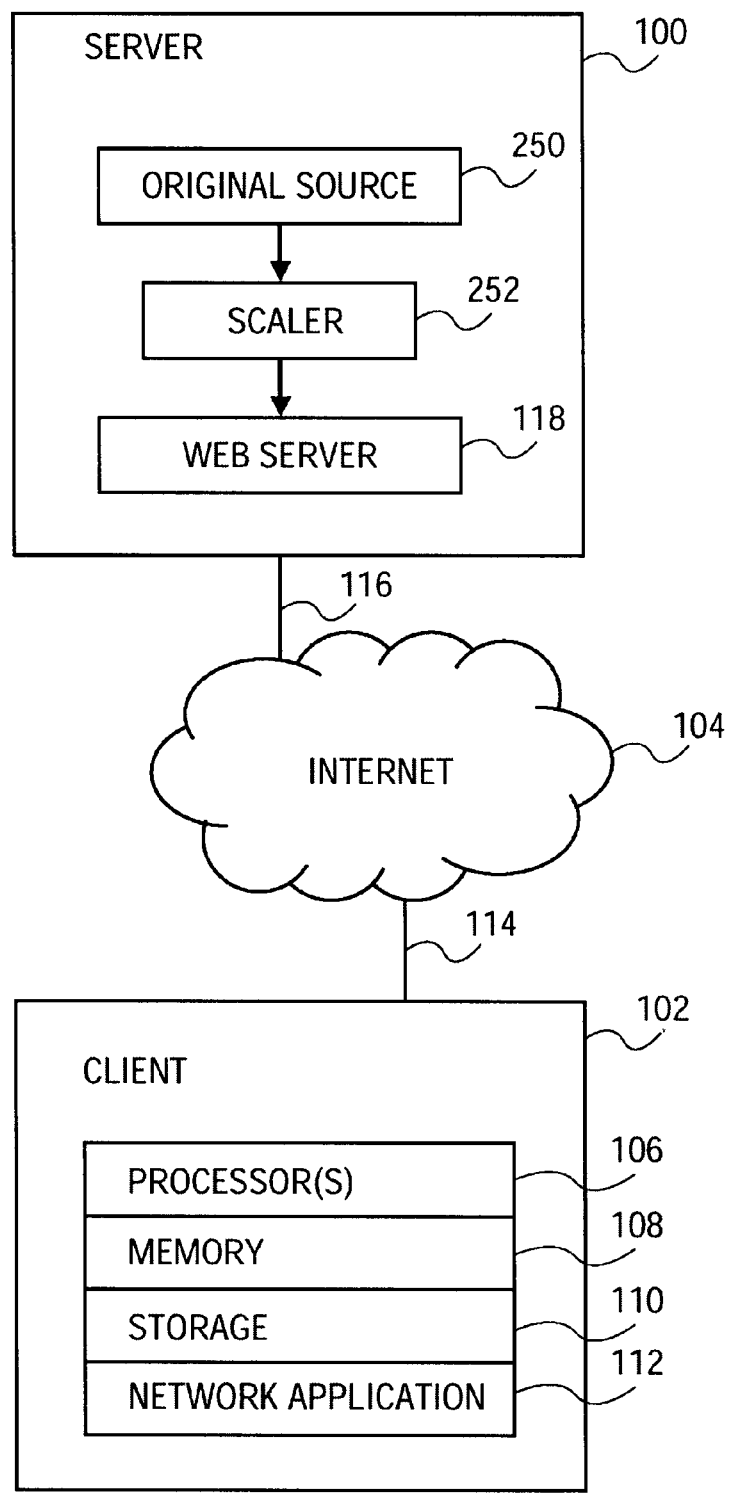
FIG. 7 illustrates FIG. 2 client-server configuration where the server performs on-the-fly scaling of data for transmission to a client, in accordance with one embodiment.

FIG. 7 illustrates a server configuration for performing on-the-fly scaling of content to deliver to a client. As discussed above, it is not necessary for the server to pre-compute different data-streams 122, 124, 126. Instead, the server 100 can be configured to have an original source content 250 to which is applied a scaler 252 that dynamically transforms, according to determined client characteristics (e.g., by received profile FIG. 5) or local testing (FIG. 6)), a source 250 into a format acceptable to the client 102. The scaler 252 can be implemented to perform on-the-fly transformation of the source 250, as well as more traditional redirection of the client to pre-scaled resources. In the illustrated embodiments, the hypothetical configuration is a server seeking to deliver a MPEG encoded news broadcast. In this context, the role of the scaler 252 is to identify the client characteristics, and the client network speed, and to convert the data into a suitable format. Hence, an "unscaled" MPEG-2 coding of the broadcast will be re-coded as an MPEG-1 or MPEG-4 broadcast, as needed.

Note that the term "scaling" includes more than simply changing video formats - it also means reprocessing the original source content 250 to allow display of the video stream on a low-resolution decoder. Preferably, the original source is stored as a scalable bit stream (see, e.g., MPEG-2), which provides for spatial, signal to noise (SNR), temporal, data partitioning, and hybrid scalability, allowing the server different options for quickly sending suitable data to the client. For example, the original source can be encoded with spatial scalability, where a low-resolution (for low-bandwidth clients) data stream is encoded along with a higher-resolution version. When a low-resolution client contacts the server, the server can quickly de-multiplex the source and present only the low-resolution data. Other adjustments to the source data include reducing display size, color depth, level of detail, etc. Note, however, that the server can be configured to fall-back to providing presenting pre-scaled resources (e.g., FIG. 5) if the server is temporarily overloaded.

Figure 8:
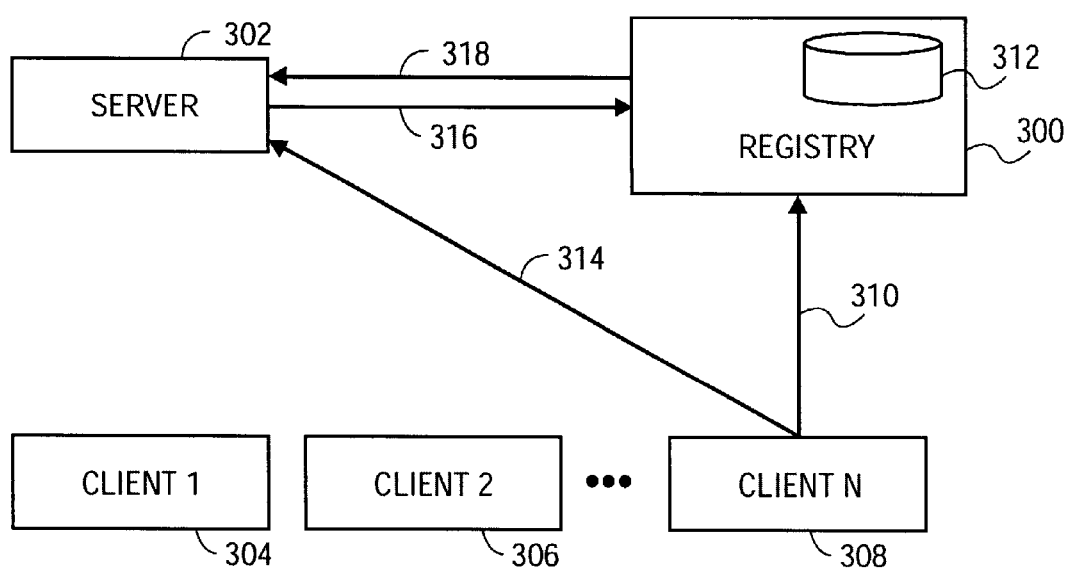
FIG. 8 shows use of a central registry for storing client characteristic profiles, in accordance with one embodiment.

FIG. 8 illustrates a client-server configuration utilizing a central registry 300. As noted above for FIG. 6, network application programs can be configured to accept a hardware.identifier (or equivalent) instruction allowing the client's identity to be tracked. Such tracking can serve many useful purposes, but it may also raise privacy concerns. The FIG. 8 embodiment advantageously addresses this issue.

Shown is a typical Internet context, in which a server 302 is serving requests from multiple client computing devices (denoted Client 1 . . . N) 304, 306, 308. The role of the registry is to store and forward client characteristic profiles. As discussed above, different pieces of information about a client are collected together and collectively referred to as the client's characteristic profile. In FIG. 5, the server was explicitly sent this characteristic profile, and in FIG. 6, the server sent code to the client for client-side processing of the profile data.

In the context of a central registry 300, all discernible client information of interest is collected and stored in a profile. In one embodiment, the profile has two portions, an identity portion, and a characteristics portion. This profile is then transmitted 310 by the client to the registry 300 over the client's network link, and the registry stores the profile in local registry storage 312. Each client profile should be indexed according to some unique identifier for the client. As discussed, a hardware.identifier method may be used, where such a method will provide a highly-unique (e.g., statistically improbable that it will be duplicated) identifier for the client. Such an identifier may be based on a unique processor identification value, a networking card identifier (e.g., a MAC address), a Globally Unique Identifier (GUID) generated from Component Object Model (COM) programming, or equivalents.

When a client contacts the server, the server will have embedded into a web page directive causing the client to transmit 314 an encrypted form of the client's hardware-.identifier value to the server. The identifier will preferably have been encrypted with a public key cryptosystem, using a public key for the registry. The server then forwards 316 the encrypted identifier to the registry, and in response the registry 300 decrypts the identifier, retrieves the client's (here Client N, item 308) profile from storage 312 and sends 318 only the characteristics portion of the profile to the server 302. In this fashion, the server is still able to customize network delivery of content according to client characteristics, while allowing the client to remain anonymous to the server. Note that network connections between Server, Registry, and Clients 1 . . . N, such as links to a commonly-accessible network, are not illustrated.

Figure 9:
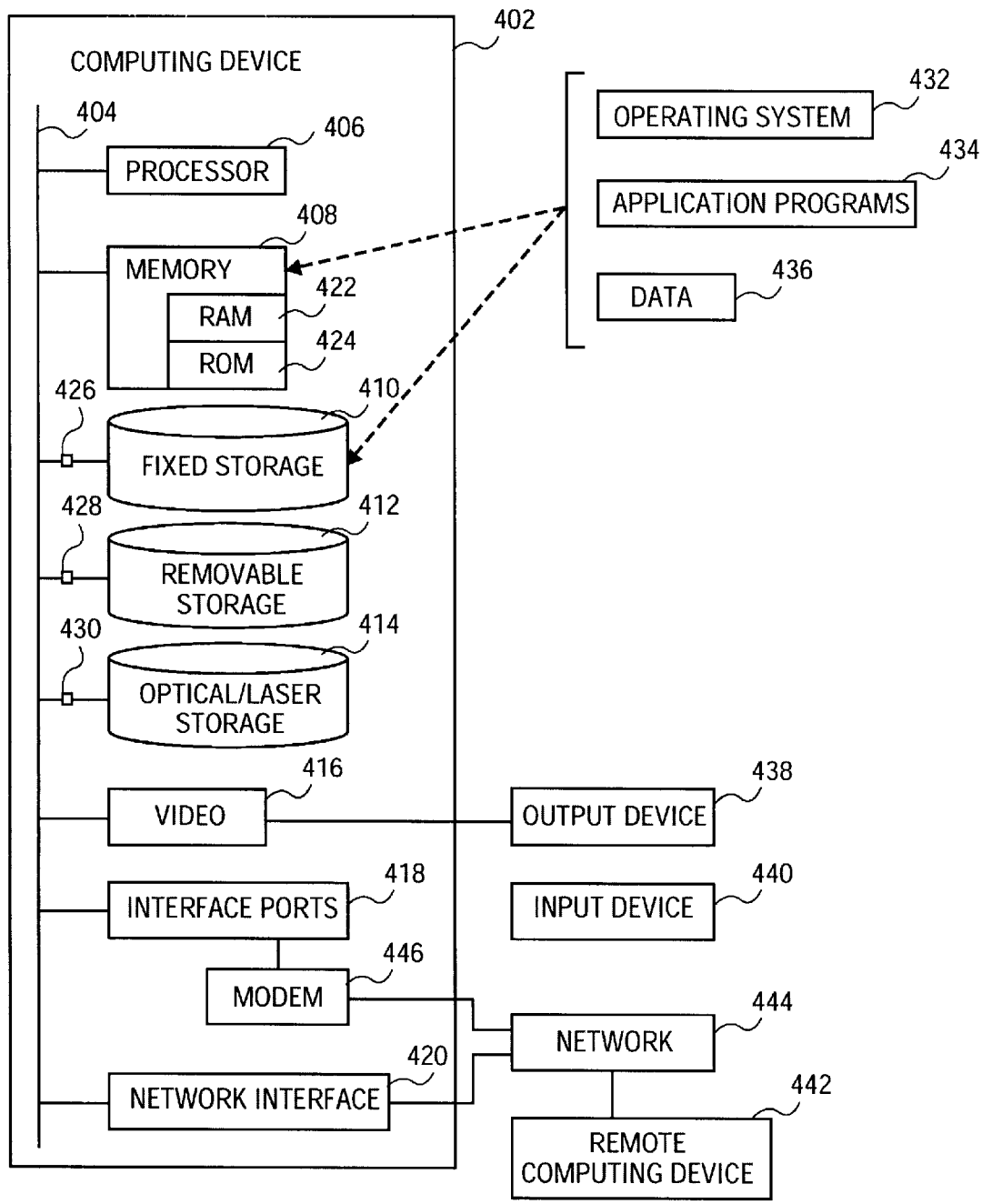
FIG. 9 shows an example operating environment for the invention.

FIG. 9 and the following discussion are intended to provide a brief, general description of a suitable computing environment in which the invention may be practiced. The invention may be described by reference to different high-level program modules and/or low-level hardware contexts. Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An example system for practicing the invention includes a computing device 402 having system bus 404 for coupling together various components within the computing device. The system bus 404 may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 404 are a processor 406, a memory 408, storage devices (e.g., fixed 410, removable 412, optical/laser 414), a video interface 416, input/output interface ports 418, and a network interface 420.

The processor 406 may be any of various commercially available processors, including Intel architecture processors, or the DEC Alpha, PowerPC, programmable gate arrays, signal processors, or the like. Dual, quad processors, and other multi-processor architectures also can be used. The system memory includes random access memory (RAM) 422, and static and/or re-programmable read only memory (ROM) 424. A basic input/output system (BIOS), stored in ROM, contains routines for information transfer between device 402 components or device initialization.

The fixed storage 410 generally refers to hard drive and other semi-permanently attached media, whereas removable storage 412 generally refers to a storage device that employs removable media such as a floppy diskette is removably inserted. The optical/laser storage 414 include devices based on CD-ROM, DVD, or CD-RW technology, and are usually coupled to the system bus 404 through a device interface 426, 428, 430. The storage systems and associated computer-readable media provide storage of data and executable instructions for the computing device 402. Note that other storage options include magnetic cassettes, tapes, flash memory cards, memory sticks, digital video disks, and the like.

The exemplary computing device 402 can store and execute a number of program modules within the RAM 22, ROM 424, and storage devices 410, 412, 414. Typical program modules include an operating system 432, application programs 434 (e.g., a web browser or network application program), etc., and application data 436. Program module or other system output can be processed by the video system 416 (e.g., a 2D and/or 3D graphics rendering device), which is coupled to the system bus 404 and an output device 438. Typical output devices include monitors, flat-panels displays, liquid-crystal displays, and recording devices such as video-cassette recorders.

A user of the computing device 402 is typically a person interacting with the computing device through manipulation of an input device 440. Common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 402 is expected to operate in a networked environment using logical connections to one or more remote computing devices. One such remote computing device 442 may be a web server or other program module utilizing a network application protocol (e.g., HTTP, FTP, Gopher, WAIS), a router, a peer device or other common network node, and typically includes many or all of the elements discussed for the computing device 402. The computing device 402 has a network interface 420 (e.g., an Ethernet card) coupled to the system bus 404, to allow communication with the remote device 442. Both the local computing device 402 and the remote computing device 442 can be communicatively coupled to a network 444 by a WAN, LAN, Gateway, Internet, or other public or private data-pathway. It will be appreciated that other communication links between the computing devices, such as through a modem 446 coupled to an interface port 418, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 406 of electrical signals representing data bits which causes a resulting transformation or reduction of the electrical signal representation, and the maintenance of data bits at memory locations in the memory 408 and storage systems 410, 412, 414, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of my invention with reference to an illustrated embodiment, it will be recognized that the illustrated embodiment can be modified in arrangement and detail without departing from such principles.

For example, while the foregoing description focused—for expository convenience—on client-server communication over the Internet, and determining client processor, memory and storage configuration, it will be recognized that the same techniques and analyses can be applied to arbitrary networks and other client characteristics that can affect client data-processing performance. In view of the wide variety of networks and client configurations, the detailed embodiments are intended to be illustrative only, and should not be taken as limiting the scope of the invention.

Rather, what is claimed as the invention, is all such modifications as may come within the scope and spirit of the following claims and equivalents thereto:

What is claimed is:

1. A web server, comprising:
   a first set of program instructions, which when executed by the web server, results in the web server performing:
   receiving an identifier from a client;
   transmitting the identifier to a central registry containing characteristic profiles for plural clients;
   receiving a characteristic profile from the central registry that includes a processing potential for the client; and
   a second set of program instructions, which when executed by the web server, results in transmitting content to the client over a network, such content scaled according to the characteristic profile.

2. A method comprising:
   receiving a request from a client comprising an identifier of the client;
   transmitting the identifier to a central registry containing characteristic profiles for plural clients;

dynamically receiving a characteristic profile from the central registry that includes a processing potential for the client; and transmitting content to the client over a network, such content scaled according to the characteristic profile.

3. A method comprising:

receiving a request from a client comprising an identifier of the client;

transmitting the Identifier to a central registry containing characteristic profiles for plural clients;

receiving a characteristic profile from the central registry that includes a processing potential for the client; and transmitting content to the client over a network, such content scaled according to the characteristic profile.

4. An article of manufacture, comprising a machine accessible medium having instructions encoded thereon for enabling a processor to perform the operations of claim 3.

5. A method according to claim 3, wherein the client characteristic profile includes information selected from a group consisting of: processor configuration, available client memory, available client disk space, and client network connection speed.

6. An article of manufacture, comprising a machine accessible medium having instructions associated therewith, which when executed, results in performing the operations of claim 3.

7. A method according to claim 3, further comprising: requesting the client to transmit the client characteristic profile to a server.

8. A method according to claim 7, wherein requesting the client to transmit the client characteristic profile includes:

determining client characteristics of interest to the server; and transmitting a code sequence to the client for processing by the client, where such code sequence instructs the client to identify the client characteristics of interest to the server.

9. A method according to claim 8, wherein the code sequence is programmed in a binary-type format immediately executable by the client upon receipt of such sequence.

10. A method according to claim 8, wherein the code sequence is programmed in an interpretable format immediately executable by the client upon receipt of such sequence.

11. A method according to claim 3, in which characteristic profiles have two portions, a first portion including the processing potential for the client, and a second portion including identity information for the client, the method further comprising:

receiving from the central registry only the first portion of the characteristic profile, so that the client may anonymously contact the server.

12. A method according to claim 11, wherein the identifier comprises an encrypted identifier for the client.

13. A method according to claim 3, wherein scaling content transmitted to the client comprises:

providing an unscaled source content;

determining client processing potential from the characteristic profile;

scaling the unscaled source content according to the client processing potential; and causing the scaled source content to be delivered to the client over the network.

14. A method according to claim 13, in which the client connects to the server at a first network address with a network application program, and wherein causing delivery of the scaled source to the client is effected by redirecting the network application program to a second network address.

15. A method according to claim 13, wherein scaling the unscaled source content is performed dynamically according to the client processing potential.

16. A method according to claim 13, in which scaling the unscaled source content is performed in advance of client contact with the server, the method further comprising:

determining a plurality of typical client characteristic profiles;

providing, for each of the plurality of typical profiles, a transmittable data stream by scaling the unscaled source according to each such typical profile;

comparing the client characteristic profile to the plurality of typical profiles to identify a most-compatible characteristic profile; and transmitting to the client the transmittable data stream corresponding to the most-compatible profile.

17. A method according to claim 13, in which the unscaled source includes compressible and uncompressible portions, and the client characteristic profile includes an indicator of the client network-connection speed, the method further comprising:

determining a scaling factor, for a compressible portion of the unscaled source, according to the indicator of the client network-connection speed; and scaling the compressible portion by the scaling factor.

18. A method of distributing scalable content between a server in communication over a network with a client computer having a processor, where scalability includes delivery of data having a complexity determined, In part, on characteristics of the client, the method comprising:

determining a characteristic profile Including a processor characteristic of the processor, and at least one item selected from a group consisting of: available client memory, available client disk space, client identifier, and client network connection speed;

providing the processor characteristic data to the server;

receiving scaled content from the server corresponding to an original source content scaled according to the processor characteristic;

transmitting the characteristic profile to a central registry for later retrieval by the server.

19. A method according to claim 18, wherein the scaled content includes advertising targeted according to the client identifier.

* * * * *

UNITED STATES PATENT AND TRADEMARK OFFICE
CERTIFICATE OF CORRECTION

PATENT NO.   : 6,470,378 B1
DATED        : October 22, 2002
INVENTOR(S)  : Tracton et al.

It is certified that error appears in the above-identified patent and that said Letters Patent is hereby corrected as shown below:

Column 2,
Between line 13 and line 14, insert -- BACKGROUND --.
Line 66, before "56K", delete "b".

Column 11,
Line 10, delete "Identifier", insert -- identifier --.

Signed and Sealed this

Fifth Day of August, 2003

JAMES E. ROGAN
*Director of the United States Patent and Trademark Office*